United States Patent [19]

Connelly

[11] Patent Number: 4,555,707
[45] Date of Patent: Nov. 26, 1985

[54] TELEVISION PULSED NAVIGATION SYSTEM

[76] Inventor: Will A. Connelly, 5220 SW. 8th St., Plantation, Fla. 33317

[21] Appl. No.: 731,331

[22] Filed: May 6, 1985

Related U.S. Application Data

[63] Continuation of Ser. No. 412,219, Aug. 27, 1982, abandoned.

[51] Int. Cl.⁴ .......................... G01S 1/24; G01S 3/02
[52] U.S. Cl. .................................... 343/387; 343/464; 343/450; 364/452
[58] Field of Search .............. 343/365, 386, 387, 359, 343/450, 464; 364/452; 367/127, 129, 907; 455/367

[56] References Cited

U.S. PATENT DOCUMENTS

| 3,262,111 | 7/1966 | Graham | 343/387 X |
| 3,613,095 | 10/1971 | Elwood | 343/387 X |
| 3,886,553 | 5/1975 | Bates | 364/452 X |
| 4,047,175 | 9/1977 | Taira et al. | 343/359 |

OTHER PUBLICATIONS

G. Kamas & S. Howe, Time and Frequency Users Manual, U.S. Dept. Commerce/National Bureau Standards Publication 559, Nov. 1979.

Primary Examiner—Charles T. Jordan
Assistant Examiner—Brian S. Steinberger
Attorney, Agent, or Firm—Eugene F. Malin; Harry W. Barron

[57] ABSTRACT

A system for navigation and positioning based on reception of selected components of television signals radiated synchronously from known sites. A receiving apparatus is used at the unknown location for which navigational coordinates are to be determined. The receiving apparatus receives television signals and measures the time intervals between receptions of selected signal components. The time interval data are used with other known data to derive hyperbolic lines of position in accordance with established conventions and techniques and the hyperbolic lines define the location of the receiving apparatus. The system serves any number of users simultaneously.

15 Claims, 6 Drawing Figures

TELEVISION PULSED NAVIGATION SYSTEM

The invention described herein was made in part with support of the Government under Department of the Navy Contract N00014-C-205 and the Government has certain rights in the invention.

This application is a continuation, of application Ser. No. 412,219, filed 8/27/82 now abandoned.

BACKGROUND OF THE INVENTION

This invention relates generally to navigation aiding systems, and particularly to a system for radio navigation and positioning on and above the Earth's surface by using the redundant component waveforms of television signals for hyperbolic radiolocation when television signals are synchronously transmitted. The inherent timing accuracy of television signals, specified and controlled by strict technical standards, is an important element in contemplation of the non-dedicated navigational system.

The navigation and positioning of sea, land and airborne vehicles and even of individual persons is a continuing problem to which continuously improved solutions have been sought and found since and even prior to the invention of the astrolabe. Particular challenges to the state-of-the-art include, but are not limited to, navigation of ships in shoal waters, congested harbors, and in search of (or returning to the sites of) mineral deposits on or below the sea floor; the navigation of aircraft during departure, enroute and arrival operations; the navigation and positioning of survey parties carrying instrumentation in vehicles, with beasts of burden or by man-pack.

A significant problem in the practice of modern electronic navigation is that, with the exception of low accuracy radio direction finding methods, all radio-based navigational systems require the establishment of dedicated transmitting stations which are expressly configured for the navigational purpose, although some systems admit of use for secondary purposes. Illustrative of systems which depend upon the use of dedicated transmitters are such public systems as Loran, Omega and Transit, and such private systems as are established to serve the needs of a small group of users, usually in a particular geographic area and generally on non-permanent basis, for example as LORAC, RAYDIST and HIFIX.

Among the earliest significant steps in the evolution of radiolocation systems were the demonstrations circa 1902–1905 by G. Marconi of directional antennas. Through use of a directional antenna, such as a loop antenna, as part of the receiving equipment, a navigator could take bearings upon several radio stations whose locations were known and ascertain his own position by triangulation. While the bearing accuracy (thus position accuracy) was generally limited by the physical constraints on portable antennas, the so-called radio direction finding method possessed the advantage of being usable with signals that could be received from any radio station, including commercial radio broadcast stations.

Experiments in 1925 by G. Breit and M. Tuve used radio frequency pulses and their reflections to measure the height of the Kennelly-Heaviside layer. The invention of the radio altimeter followed in 1928. In both the experiments and the invention, the determination of distance was made by measuring the interval between the time a pulse was transmitted and the time the reflected signal was returned and by applying the known velocity of radio propagation to convert the time interval to distance. The same principle is applied in radar, another navigational aid.

The first system widely used to determine the position of an unknown receiving point by the hyperbolic method was Loran, which was substantially developed during World War II. Present day Loran-C, Omega and many other navigational systems depend for their operation on evolutions of the basic hyperbolic method in which differences in the time at which signals from a number of transmitters at known locations are received at an unknown point may be used to construct (on charts or, contemporaneously, through computer processing of the interval and other data) hyperbolic lines of position the intersections of which define the unknown location.

SUMMARY OF THE INVENTION

This invention is to systems for radio navigation and positioning. The navigation system includes the signals that are synchronously transmitted from different sites by conventional television stations and television relaying stations. A receiving apparatus is utilized at the point for which navigational coordinates are to be determined. The apparatus receives the transmitted signals and measures the differences in the arrival times of specified and identified components within the radiated signals at the position of the receiving antenna. The time differential data are used with other known data to derive the receiving antenna position relative to the transmitting antenna sites by employment of the established conventions and techniques for radiolocation by hyperbolic means.

The receiving apparatus is designed to receive and utilize signals transmitted from present and future commercial television stations without the necessity of building dedicated transmitter stations. Present day television signals are usable without alteration by the receiving apparatus disclosed herein when an appropriate set of television transmissions are received. The signals appropriately used for navigation are insensitive to, and independent of, the video picture content of the transmitted commercial television signal.

The invention is a pulsed navigation system which evolves from the previously uncorrelated facts that television signals generated for a wholly different purpose contain redundant pulses and waveforms which are accurately timed, and that television signals may be and actually are transmitted synchronously by a multiplicity of transmitters sited terrestrially and in space. Through employment of the receiving apparatus of the invention, the redundant pulses and waveforms of synchronously transmitted television signals may be extracted and processed to provide navigational and positioning data by applying the methodology of hyperbolic radiolocation that has been demonstrated in various iterations and extrapolations in such present radiolocation systems as Loran, Raydist (TM) and Hi-Fix (TM). The use of the invention requires no modification of television signals as commercially practiced and accordingly does not require the use of transmitters dedicated exclusively, or even primarily, to the navigational purpose; it is a significant feature of the invention that it is the first of its genre not to require dedicated transmitting equipment since the advent of the antiquated radio direction finder (which does not employ the same navigational method).

The invention is a radiolocation (navigation) system which is based upon the use of commercially practiced television signal transmissions. In addition to the variable and everchanging image (picture) content, television signals contain certain redundant waveforms and pulses which, though intended for the purpose of synchronizing television receivers to correctly position and to establish color reference for the reproduced image, are of such character that they can be exploited in a wholly different manner for radiolocation when received and processed by a suitable receiving apparatus, examples of which are to be described. The invention is also based on that fact that in commercially practiced television signal distribution and broadcasting, signals having a common point of origin which are thus identical to each other are transmitted synchronously by a multiplicity of transmitters; examples of synchronous transmissions of this type are the broadcasts of network-originated television programs by many stations and the use of translator stations that rebroadcast the signals of a main station.

The sources of signal origin, the means of distribution through which synchronous transmission may be effected, and the television transmitters that broadcast the signals pre-exist as assets of the television industry. No additions to these assets are required to make them useful for the navigational purposes of the invention. Neither is it necessary to alter the technical standards that describe the content and format of the redundant elements of television signals. The invention is practiced simply by use of appropriate receiving apparatus which measures the intervals between reception of identical, common origin signals and processes these data in accordance with the demonstrated methods of hyperbolic radiolocation to produce a navigational or positioning output for the receiver relative to the known locations of the transmitters.

In one embodiment of the receiving apparatus, common television receivers, from which such unnecessary elements as the picture tube, sweep circuits and sound system may be omitted if desired, may be used to deliver the output pulses derived from detection of that portion of transmitted television signals commonly referred to as the vertical interval. The intervals between reception of the same vertical intervals from three transmitters are measured by intervalometers, and an appropriate pair of such measurements are processed to provide the navigational output. This embodiment of the receiving apparatus is usable with both monochrome and color television transmissions and delivers positioning updates at the field transmission rate of the transmitted signals.

In another embodiment of the receiving apparatus, usable when the television signals transmitted contain fixed frequency color reference waveforms, the portion of the signal commonly known as the color burst is detected and is used to generate output pulses which control the counting of intervalometers the outputs of which are used as in the first described embodiment to produce the desired navigational output. A more rapid navigational update rate is practicable with this embodiment because color burst signals are transmitted more frequently than vertical interval signals.

A general object of the invention is to provide a navigation aid which permits the determination of an unknown position at and above the Earth's surface through use of television signals radiated by present and future television transmitters.

Another object is to provide a navigation aid which does not require the use of transmitters dedicated exclusively or even primarily to service of the navigational purpose of the invention.

Another object is to provide a navigation aid which does not require means of transmitter synchronization dedicated exclusively to service of the navigational purpose of the invention.

Another object is to provide a navigation aid which does not require additions to or deletions from the transmission format of television signals as commercially practiced to permit those signals to be used for the navigational purpose of the invention.

Another object is to provide a navigation aid the operation of which is insensitive to and independent of the video image (picture) content of the transmitted television signals.

Another object is to provide a navigation aid which may be used wherever an appropriate set of television signals may be received.

Another object is to provide a navigation aid that may be used with television signals transmitted from terrestrial or non-terrestrial points.

Another object is to provide a navigational aid in which any of the several standardized waveforms of commercial television signals may be used to achieve an optimum compromise between navigational accuracy and update rate for any of the several applications in which the invention may be practiced.

In accordance with these and other objects which will be apparent hereinafter, the instant invention will now be described with particular reference to the accompanying drawings.

DESCRIPTION OF PREFERRED EMBODIMENTS

Figure 1:
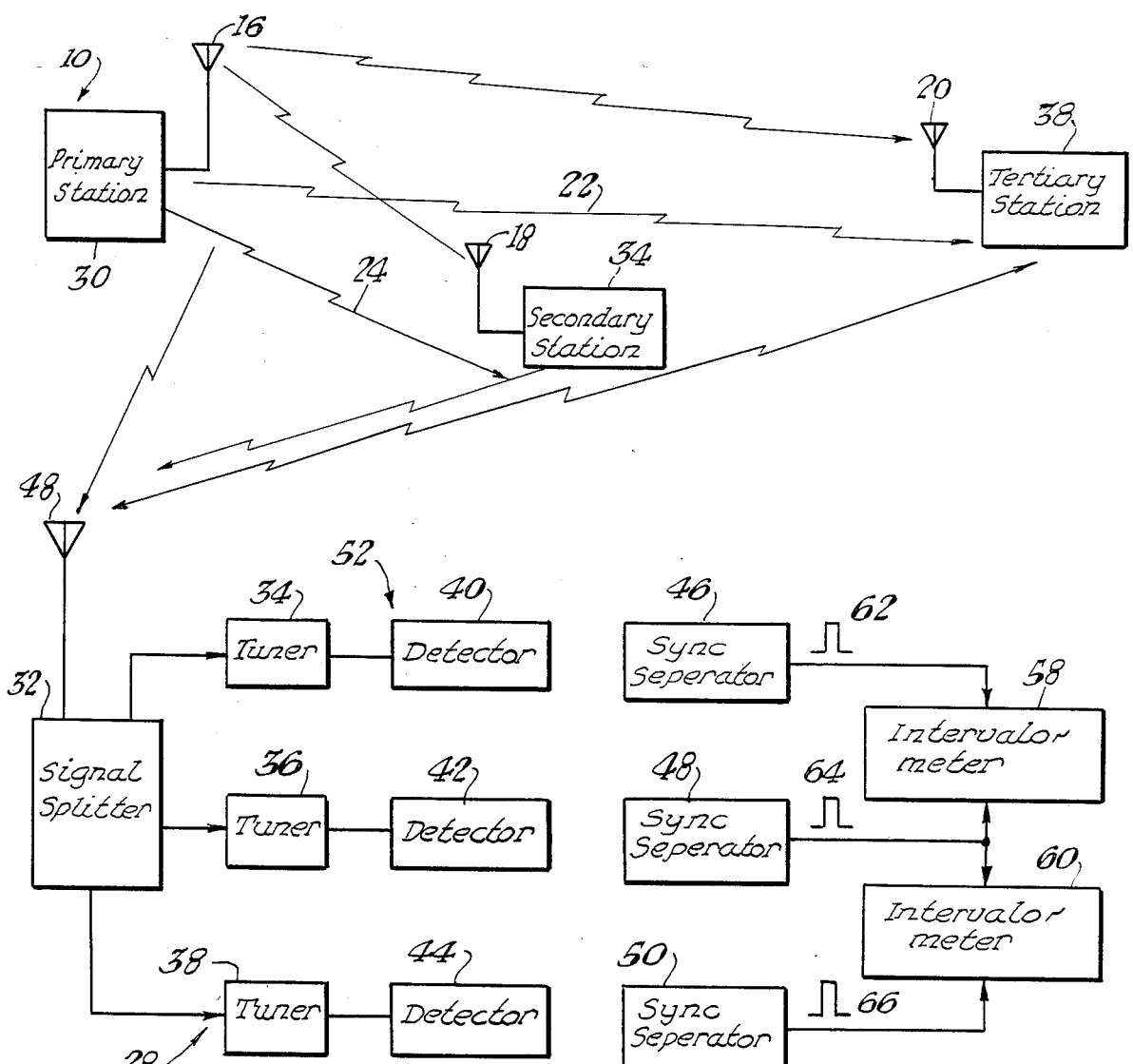
FIG. 1 is an illustration partially in block diagram form, of one embodiment of the invention.

In FIG. 1 is shown the general disposition of the apparatus of the invention which is comprised of primary, secondary and tertiary television transmitters 30, 34 and 38 at different locations connected to antennas 32, 36 and 40; a receiving system 48 connected to a broadband receiving antenna 46; and means indicated by dashed lines 42 and 44 by which the television signals that modulate primary transmitter 30 are connected to and modulate secondary and tertiary transmitters 34 and 38 so that the signals radiated by antennas 32, 36 and 40 are synchronous each with the others.

The primary, secondary and tertiary transmitters 30, 34 and 38 and the antennas 32, 36 and 40 to which they are connected may be sited on Earth or aboard suitable platforms in space. The locations of the transmitting antennas 32, 36 and 40 are assumed to be known at such times as the invention is practiced.

The receiving system 48 and the receiving antenna 46 may be located wherever signals radiated by antennas 32, 36 and 40 may be simultaneously received.

For the clearest understanding of the invention it is first useful to consider the nature of television signals as television is practiced by governments and commercial institutions that comprise the activities that engage in the art and science of television broadcasting. Such activities have formulated technical standards which specify and govern the dimensions of the electromagnetic pulses and waveforms, and the patterns of such pulses and waveforms, that constitute the redundant portions of television video signals as the same are differentiated from the non-redundant, continuously variable image (picture) portions of the total signal. All present technical standards specify the numbers, amplitudes, shapes, durations and repetition rates of pulses which, after demodulation by a television receiver, control the horizontal and vertical sweep circuits of the receiver. There are also specified in the standards applicable to color television the characteristics of the waveforms that serve as fixed references for the decoding of color intelligence by the receiver. There are thus contained within television signals a multitude of known electromagnetic components which, though intended for television purposes, may be used as references for the timing of a navigational system and which, as shall be more fully explained, are in fact so employed in the practice of the present invention.

The television standard that governs the generation of signals for both monochrome and color television in the United States is Tentative Standard RS-170A of the Electronic Industries Association which is commonly referred to as the NTSC (after the formulating National Television Systems Committee) standard. In all explanations of the invention that follow, it will be assumed that the television signals are generated in accordance with this standard although it should be understood that the invention may be adapted readily to permit its practice should the television signals be generated in conformity with any other technical standard which specifies the redundant content of television signals.

Also to be considered as part of the preliminary examination of television as commercially practiced are the means by which synchronous transmission of signals occur for a multiplicity of television transmitters. It is common practice for television programs to be originated by a television broadcast network and for the signals containing the program information to be distributed by cable and/or microwave radio links to geographically disbursed television stations which broadcast these signals in real time and thus synchronously with the source of the signals and with each other. It is also common contemporary practice for a television station which seeks to expand its coverage area to use repeater or translator stations which receive the signal from the main station off-the-air and re-transmit that signal in real time, again producing synchronous transmission of a common signal by a multiplicity of transmitters. It should be understood that so-called network signal "feeds" and repeater or translator operations are not the only means through which synchronous transmission may be accomplished and that the objectives of the invention may be satisfied if the synchronism is achieved by other means.

Let it be assumed that the means 42 and 44 by which the signals transmitted by the primary transmitter 30 are transmitted synchronously by secondary and tertiary transmitters 34 and 38 are connections effected through reception of the primary station 30 signals off-the-air at the sites of the secondary and tertiary transmitters 34 and 38 and that the signal being transmitted at any given moment in time by primary transmitter 30 will be subsequently re-transmitted in order by the secondary and tertiary transmitters 34 and 38. Let it be further assumed that the signals from the primary, secondary and tertiary transmitters 30, 34 and 38 are received in the same order at the unknown position of receiving antenna 46. Let it be further assumed that a specific pulse or waveform from the redundant portion of a television signal is designated as a reference signal and that the reference signal when received at the unknown position can be correctly identified by its shape or repetition rate or position within the continuous television wavetrain or some suitable combination of the foregoing or other characteristics which are known. Let it be further assumed that fixed time delays attributable to the passage of television signals through antenna feed lines, equipment and facilities of the apparatus of the invention are known; that fixed delays attributable to the propagation of radio waves at the known velocity of radio wave propagation from the primary transmitter 30 to the secondary and tertiary transmitters 34 and 38 are also known; and that all such known fixed delays will be appropriately processed out of the ultimate navigational results through the proper programming and operation of a computer incorporated within the receiving system 48 as will be more fully explained. Finally, let it be assumed that the velocity of radio wave propagation, approximately 300 meters per microsecond, along the radio paths between each of the primary, secondary and tertiary transmitters 30, 34 and 38 and the receiver 48 is also known.

Figure 4:
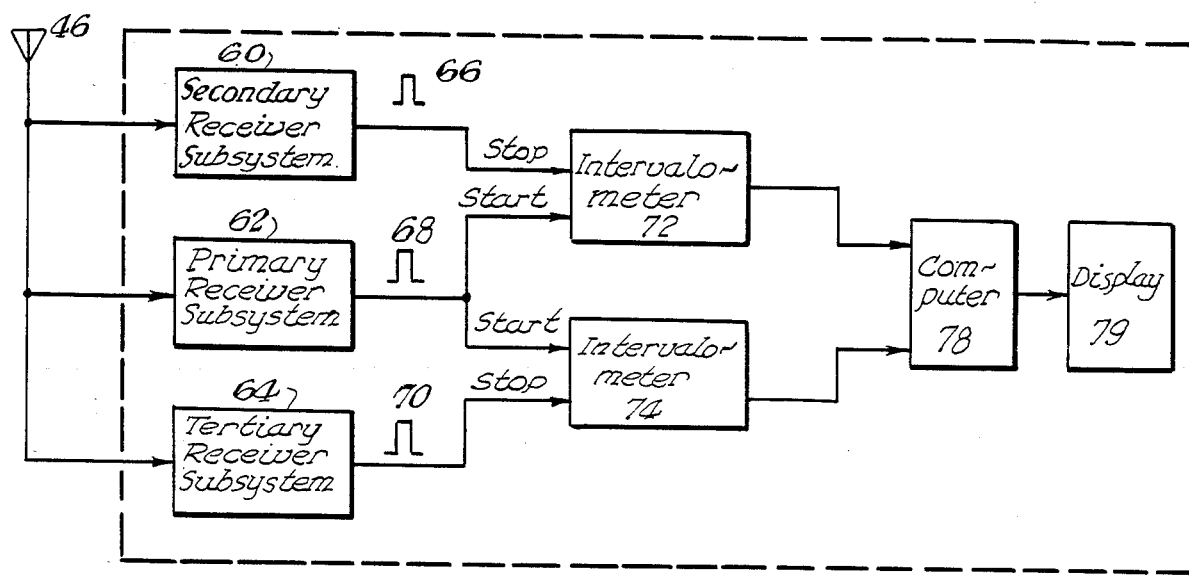
FIG. 4 is a block diagram of one embodiment of the invention.

In FIG. 4 is depicted the receiving system apparatus 48 in general form comprised of primary, secondary and tertiary receiver subsystems 62, 60 and 64 all of which are connected to receiving antenna 46 and as shown to intervalometers 72 and 74 which are in turn connected to computer 78 the output of which is presented on a display 79 of suitable and convenient form. Each receiver subsystem 62, 60 and 64 contains facilities for the tuning and demodulation of television signals as shall be more fully explained. When the primary receiver subsystem 62 is tuned to the channel frequency of signals from the primary transmitter 30; the secondary receiver subsystem 60 is tuned to the channel frequency of the secondary transmitter 34; and the tertiary receiver subsystem 64 is tuned to the channel frequency of tertiary transmitter 38, a pulse 68, 66 or 70 will be delivered by each receiving subsystem 62, 60 and 64 in response to the reception of each previously mentioned reference signal transmitted by the corresponding transmitter 30, 34 or 38. The intervalometers 72 and 74 are so connected that a time interval count is initiated on both simultaneously when a pulse 68 is delivered by the primary receiver subsystem 62. The count of primary-to-secondary intervalometer 72 is stopped and an output is delivered to computer 78 when a pulse 66 is delivered by the secondary receiver subsystem 60. The count of primary-to-tertiary intervalometer 74 is stopped and an output is delivered to computer 78 when a pulse 70 is delivered by the tertiary receiver subsystem 64. The data output of the primary-to-secondary intervalometer is the interval between the time the reference signal is received from the primary transmitter 30 and the time the same reference signal is received from the secondary transmitter 34. The data output of the primary-to-tertiary intervalometer is the interval between the time the reference signal is received from the primary transmitter 30 and the time the same reference signal is received from the tertiary transmitter 38.

The computer 78 is programmed to accept the data from both intervalometers 72 and 74 and, additionally, data on the known locations of transmitters 30, 34 and 38; data on known fixed delays attributable to signal propagation along connecting means 42 and 44 and to antenna feedlines, equipment and facilities; and data on any deviations from the nominal 300 meters per microsecond velocity of radio wave propagation that may be known to exist along radio paths. The computer 78 is further programmed to process all the data to produce a navigational output in accordance with the well established principles of hyperbolic radiolocation as expounded in *Electronic Surveying and Navigation,* Simo H. Laurila (Wiley Interscience, 1976) and practiced in various evolutions and iterations in such contemporary Loran C receiving systems as the Trimble Navigation Model 100 Supernavigator, the Sitex/Koden Model 757C receiver and the ITT Decca Marine Model 1024 receiver and employed also in the inventions covered by U.S. Pat. Nos. 3,111,663 and 3,111,664. Briefly stated, the hyperbolic method involves the use of the differences in time at which signals synchronously transmitted from sources at known locations are received at an unknown location to construct mathematically hyperbolic lines the intersections of which define the unknown receiving point. In the present invention the earlier practice of plotting the hyperbolic lines on suitable charts is made unnecessary by the use of computer 78 and display 79, which together calculate and display the navigational output in any convenient geographical coordinate system (such as latitude and longitude), but it should be understood that the older method may be employed by using the time interval output data from intervalometers 72 and 74 and the data on known station locations, fixed propagation delays and propagation velocity deviations to generate graphical solutions on suitable charts.

Proceeding from the assumption that the transmitters 30, 34 and 38 and related facilities such as means of interconnection 42 and 44 are conventional television broadcast stations or other suitable sources of signals, it will be seen that the practice of the invention may be accomplished with a suitable receiving apparatus which may take the general form depicted in FIG. 4, in which receiving subsystems 62, 60 and 64 will deliver pulses 68, 66 and 70 to control the operation of the intervalometers 72 and 74 in response to reference signals received from the primary, secondary and tertiary transmitters 30, 34 and 38, and with a computer 78 and display 79 performing the functions previously explained. It may be understood that the receiving subsystems 60, 62 and 64 can be configured differently to make use of different component pulses or waveforms within the redundant portion of the television signal as the reference signal from which the navigational output will be derived after reception.

Figure 2:
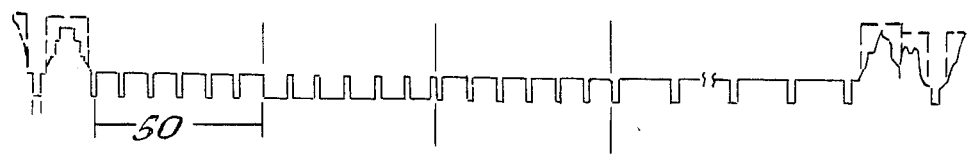
FIG. 2 depicts a portion of the wave train for United States television transmission signal including the vertical synchronizing pulses.

In FIG. 2 is shown a wavetrain of pulses 50 which are part of the redundant portion of a television signal and which may therefore be used as the reference signal for the navigational purpose of the invention. The pulses 50 depicted are commonly referred to as the vertical synchronizing pulses and are transmitted once during each field of the two field frame that makes up one complete television picture.

Figure 5:
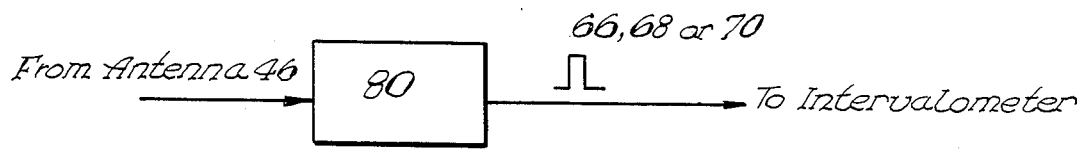
FIG. 5 is a block diagram of the receiver subsystem.

FIG. 5 illustrates a receiving subsystem 80 which may be used as the primary, second and tertiary receiver subsystems 60, 62 and 64 of FIG. 4 when vertical synchronizing pulses 50 are chosen to serve as the reference signal for the navigational purpose. The receiving subsystem is a common television receiver 80 to which a connection is made to the output of a circuit, which may conveniently be the vertical sync separator circuit, from which a pulse is delivered as output in response to the presence of a vertical sync pulse 50 wavetrain in the modulation of a television radio frequency signal to which the channel selector of the television receiver is tuned. If the television receiver occupies the position of the primary receiver subsystem 62 of FIG. 4, the output pulse delivered from the receiver 80 will be the pulse 68 which starts the counting operations of both the primary-to-secondary and primary-to-tertiary intervalometers 74 and 74. When television receivers 80 are used as the secondary and tertiary receiver subsystems 60 and 64 in FIG. 4, the corresponding pulse outputs will be pulses 66 and 70 respectively which stop the counts of intervalometers 72 and 74 respectively.

It may be understood that there may be omitted from television receivers 80 such circuits and components as are not essential to the operation of the apparatus, such as the picture tube and associated sweep circuits, the loudspeaker and associated audio circuits, and the sound demodulator, but that these elements may be retained for convenience or as an aid to identification of stations being received.

It will be deduced that the navigational update rate, that is, the rate at which fresh positioning information derived from reception of vertical synchronizing pulses 50 may be presented on display 79, is established by the field rate of the television standard in accordance with which the television signals are generated, which is approximately 60 times per second for the NTSC standard.

The first embodiment of the receiving apparatus of the invention depicted in FIG. 4 may therefore be comprised of the receiving antenna 46, three television receivers 80 as receiving subsystems 60, 62 and 64, the intervalometers 72 and 74, the computer 78 and the display 79 which, in whole, will derive a navigational output from reception of the vertical sync pulse wavetrains 50 successively transmitted by primary transmitter 30 and re-transmitted by secondary and tertiary transmitters 34 and 38.

Figure 3:
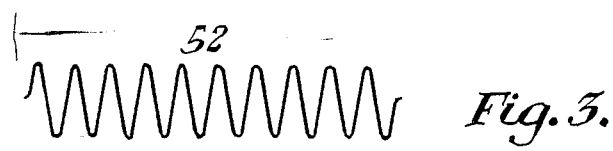
FIG. 3 depicts a color burst waveform.

A second embodiment of the receiving apparatus shown in FIG. 4 is based upon receipt of another component of the redundant portion of a television signal, the color burst waveform 52 depicted in FIG. 3. The color burst waveform 52 is transmitted 254 times during the first field and 253 times during the second field of one television frame generated in accordance with the NTSC technical standard. In this embodiment of the invention are employed receiving subsystems 60, 62 and 64 as depicted schematically in FIG. 6.

Each receiving subsystem 60, 62 and 64 comprises a television receiver 90; a burst gate 92; a burst regenerating crystal 96; a phase-locked loop circuit 98; a comb generator circuit 109; and a dual-beam oscilloscope 120.

Television receiver 90 may be a conventional television receiver to which connection is made to extract the output of the video detector circuit or any receiver capable of receiving television signals and delivering baseband video output. The television video signal is fed to burst gate 92 which is caused to gate open, and thus pass the signals through, by a sequence of pulses 122 which occur in the 'comb' pattern of color burst waveform 52 generation and transmission. When the receiving subsystems 60, 62 and 64 are adjusted for operation as shall be further described, color bursts 52 pass through burst gate 92 and the color burst energy causes crystal 96, which is series-resonant at the color burst frequency, to 'ring', thereby regenerating the burst frequency as a continuous wave (CW) signal. The CW output of the ringing crystal 96 is applied to one input of the phase comparator section 100 of phase-locked loop 98.

The phase-locked loop 98 comprises a phase comparator section 100, which delivers a control signal proportional to the phase difference between the signals applied to its two inputs; a voltage-controlled crystal oscillator (VCXO) 102, the approximate frequency of which is determined by crystal 104 which is cut to operate at four times the color burst frequency (about 14.318 MHz) and frequency trimming capacitor 106; and a divide-by-four circuit 108 which divides the 14.318 MHz output of the VCXO 102 by exactly four and delivers its output to the second input of the phase comparator section 100. When regenerated color burst in CW form is present at the first input of the comparator section 100, the circuitry of the phase-locked loop 98 locks to the phase and frequency of this signal and the output from the VCXO 102 is coherent with the CW input.

Figure 6:
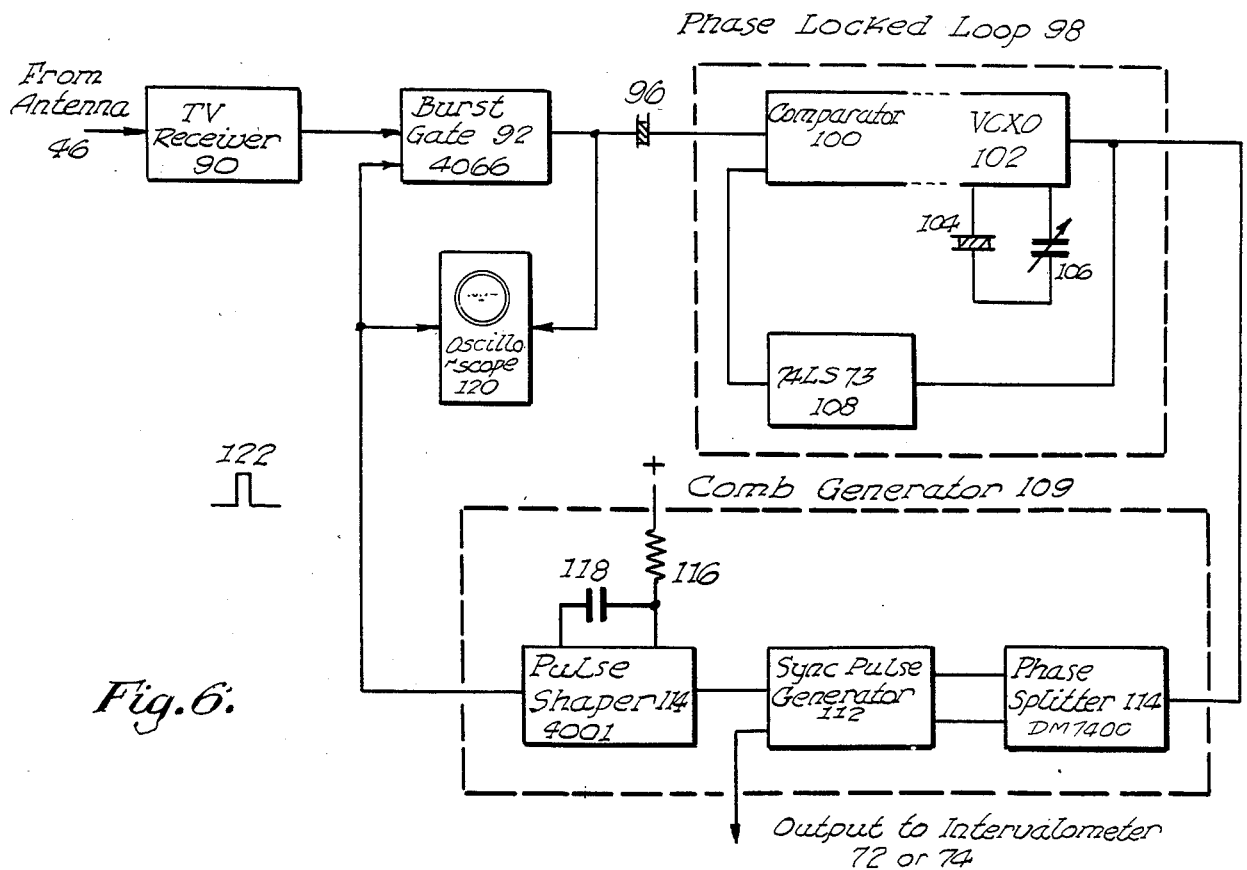
FIG. 6 is a block diagram of another embodiment of the invention.

The output of the phase-locked loop 98 VCXO section 102 is 14.318 MHz square wave which is fed to comb generator 109. The comb generator comprises a phase splitter 110, which accepts the 14 MHz input and delivers two outputs at the same frequency, but 180 degrees out of phase with each other; a television sync pulse generator circuit 112 which replicates, from the 14 MHz input, the pulse comb pattern to be more fully described and certain other pulses which may be used for the navigational purposes of the invention; and pulse shaper 118 with resistor 116 and capacitor 118, the values of which are selected so that the comb pulses present at the circuit input have a uniform width of slightly greater than 2.52 microseconds, the duration of the color burst waveform, when delivered as output pulses 122. Output pulses 122 are fed to the control input of burst gate 92 and are also fed to one vertical input channel of oscilloscope 120. From the sync pulse generator 112 may be taken pulses corresponding to the frame (approximately 30 Hz), field (approximately 60 Hz) or horizontal (approximately 15734 Hz) repetition rates of the NTSC television standard; any of these pulses, or pulses derived from them or from the 3.58 color subcarrier output which is also available from the particular integrated circuit (Fairchild type 3262A) employed as the sync pulse generator, may be used as the pulses to control the operation of intervalometers 72 and 74, the choice being determined by the desired rate of navigational update and the potential for positionally ambiquous readout in given operational scenarios. In FIG. 6 the output to intervalometers 72 or 74 is shown connected to the vertical drive pin of sync pulse generator 112, which provides for a 30 Hz approximate update rate and non-ambiguous navigational lane width of 10,000 kilometers. All pulses delivered by sync pulse generator 112, and the comb generator 109 output pulses 122, are synchronously coherent with the output of phase-locked loop 98.

The pattern of output pulses 122 duplicates the pattern in which color burst waveforms 52 are transmitted by transmitters 30, 34 and 38. The serial pattern of comb generator output pulses 122 during each 525-line television frame is: an initial set of nine line periods (each line period being approximately 63.55 microseconds) during which no pulses 122 are put out; 254 line periods containing one pulse 122 each; nine line periods during which no pulses 122 are put out; and 253 line periods containing one pulse 122 each. It is useful as an aid to understanding of the operational principles of the receiving subsystems 60, 62 and 64 of the present embodiment to envision the comb generator output pulses as the teeth of a comb from which some teeth are missing; the pattern of received color burst waveforms 52 present at the input to the burst gate 92 as a second, identical such comb; and to recognize that should the two combs be overlaid, there is but one position in which all the teeth and apertures would be exactly coincident. The two comb patterns, one in the form of color burst waveforms 52 which are permitted to pass through burst gate 92 and are displayed on one trace of oscilloscope 120, and the other in the form of rectangular pulses 122 which are just wide enough to overlay a color burst waveform 52 which is displayed on the second trace of oscilloscope 120.

The oscilloscope 120 sweep is adjusted to produce on one trace the stationary image of the output pulses 122 corresponding to one full television frame, that is, a presentation of 507 output pulses 122. On the second trace will appear such portions of the video signal as are present at the input to the burst gate 92 at the times the burst gate 92 is keyed open by the comb generator output pulses 122.

For the readiest understanding of the receiver subsystem 60, 62 and 64 operation, it may be assumed that, when television receiver 90 is first tuned to a television signal, the pattern of color burst waveforms 52 present at the input to the burst gate 92 is not coincident with the pattern of comb generator output pulses 122; that is, although the patterns are the same, they are displaced from each other in time, and thus positionally. For this condition, there will be no color burst waveform 52 energy passed through the burst gate 92 to ring the regenerating crystal 96 and provide the CW signal to the first input of the phase comparator circuit 100 of the phase-locked loop 98. The VCXO 102 will free-run at the frequency determined by its crystal 104 and the setting of the trimmer capacitor 106, which is adjusted to produce a VCXO 102 output frequency near, but not identical to, four times the frequency of color burst waveforms 52. As a consequence of the difference in frequency between received color burst waveforms 52 and the unlocked frequency of the phase locked loop 98 output, the whole period for one full frame of output pulses 122 from the comb generator 109 will not be precisely the same as the period of one full frame of received television signal, and there will be a relative positional drift of the received color burst waveform 52 pattern relative to the pattern of the comb generator 109 output pulses 122, and this drift will be observed as lateral (time) motion of the trace of oscilloscope 120 upon which the output of the burst gate 92 is displayed. At some point in time the relative pattern drift will result in the appearance on this trace of the pattern of color burst waveforms 52, in partial or full coincidence with the pattern of comb generator 109 output pulses 122. As color burst waveforms 52 begin to appear at the output of the burst gate 92, and also on the appropriate trace of oscilloscope 120, color burst energy will begin to reach the ringing crystal 96; CW at the burst frequency will appear at the first input to the phase comparator section 100 of phase-locked loop 98; the phase-locked loop 98 will lock to the color burst waveforms 52 and the previously observed motion on the trace of oscilloscope 120 upon which the burst gate 92 output is displayed will cease. If lock-up occurs at an instant at which there is full coincidence between the received color bursts and comb generator 109 output pulse 122 patterns, then examination of the traces of oscilloscope 120 will reveal that for each and every comb generator output pulse 122, there is a correspondingly positioned color burst waveform 52. Should this condition not obtain, as evidenced by the presence of color bursts appearing beneath either of the nine line apertures in the comb generator 109 output pulse 102 pattern, the phase locked loop 98 may be unlocked by any convenient means, such as temporary change in the value of the trimmer capacitor 106 of the VCXO 102, and permitted to re-lock after further relative drift as previously described has occurred. The sequence of pattern observation, loop unlock and pattern drift, and loop lock-up is repeated until full pattern coincidence is achieved. When the patterns are fully coincident, the sweep of oscilloscope 120 is increased to provide a full-screen display of one comb generator output pulse 122. If it is found that the leading and trailing edges of the pulse do not coincide with the start and finish of the associated color burst waveform 52, the phase locked loop 98 may be momentarily unlocked and the VCXO 102 frequency minutely shifted by any convenient means, including a momentary change in the value of capacitor 106, to cause the color burst waveform 52 to drift into precise coincidence with the corresponding pulse 122, whereupon the phase-locked loop 98 is permitted to re-lock; when the aforementioned operational condition has been achieved, and there is complete coincidence of the patterns and of color burst waveforms 52 with respect to the comb generator 109 output pulses 122, the entire receiving subsystem 60, 62 or 64 is operating synchronously with the signals received from the appropriate transmitter 30, 32 or 34. Such pulse as may be selected and extracted from the sync pulse generator 112 to control the operation of intervalometers 72 or 74 will be synchronous with the same pulses emitted by transmitters 30, 34 and 38 and may be used for the navigational purpose of the invention precisely as though the transmitted pulses had been received and used directly. The advantage of this embodiment of the receiving subsystems 60, 62 and 64 is that the redundant television signal possessing the highest accuracy and the narrowest occupied frequency bandwidth, but which is otherwise difficult to use directly because the effective non-ambiguous navigational lanewidth of individual cycles of color burst is less than 84 meters, is used.

It should be understood that while implementations of burst gate 92, phase locked loop 98, and comb generator 109 depicted in FIG. 6 employ specific integrated circuits and interconnections as an aid to understanding, each of these systematic elements may be alternatively executed in discrete components or with different circuits to accomplish the same end result, which is the exploitation of the advantageous characteristics of the television signal waveform which in any given system of television serves as the frequency and phase reference for color reproduction. It should be understood also that, with particular reference to the phase locked loop 98 and the comb generator 109, alternative implementations may require the use of different operating frequencies for the VCXO 102, a different means of interfacing between the VCXO 102 and the sync pulse generator 112 than is represented by phase splitter 110 (e.g., the National Semiconductor sync generator chip requires 2.04545 MHz input, the Ferranti ZNA 134J requires 2.583 MHz input, etc.) and that the operating frequencies for conformity with television technical standards other than NTSC will also differ.

The second embodiment of the receiving apparatus shown in FIG. 4 may therefore be comprised of the receiving antenna 46, three receiving subsystems of the type described above ahd illustrated in FIG. 6 used as primary, secondary and tertiary receiving subsystems 62, 60 and 64, the intervalometers 72 and 74, the computer 78 and the display 79 which, in whole, will derive a navigational output through reception of color burst waveforms 52 successively transmitted by primary transmitter 30 and re-transmitted by secondary and tertiary transmitters 34 and 38.

The instant invention has been shown and described herein in what is considered to be the most practical and preferred embodiment. It is recognized, however, that departures may be made therefrom within the scope of the invention and that obvious modifications will occur to a person skilled in the art.

1. A method in aid of navigation and positioning using television and no other radiated signals comprising the steps of:
   receiving simultaneously at an unknown location two television signals each containing a mutually common and idehtical redundant waveform component, said component being identically positioned in each said signal in accordance with the technical standard pertaining to said signals, said signals being radiated synchronously from two different known locations;
   extracting said component from each of said signals;
   measuring and delivering as output the measurement of the elapsed time between extraction of said component from first one received said signal and then from the other received said signal; and
   deriving from said output and known locations a hyperbolic line of position to define a first coordinate of the unknown location.

2. A method as set forth in claim 1 including the steps of:
   receiving simultaneously with said signals at said unknown location a third television signal containing the same mutually common redundant waveform component as in said signals, said component identically positioned as in said signals and radiated synchronously with said signals from a third different known location;
   extracting from said third signal the same said waveform component extracted from the other of said signals;
   measuring and delivering as a second output the measurement of the time elapsing between extraction of said component from said third signal and extraction of said component from either other said signal; and
   deriving from said outputs and known locations two intersecting hyperbolic lines of position to define simultaneous first and second coordinates of the unknown location.

3. A method as set forth in claim 2 including the step of:
reducing said coordinates to conventional navigational coordinates.

4. A navigation and positioning system for locating an unknown position utilizing at least two television signals conforming to the same technical standard and no other radiated signals and synchronously radiated from two different known locations, each said signal including identical and mutually common redundant waveform components occupying in one said signal the same place as in the other said signal, said system comprising:
television signal receiving means at the unknown position for simultaneously receiving said signals; means to extract from each of said signals the same specified mutually-common redundant waveform component; means to measure elapsed time connected to said receiving means and to provide the measure of elapsed time between the extraction of said component first from one received signal and then the other received signal; and means to derive from said provided measure of elapsed time and known locations a hyperbolic line of position to define a first coordinate of said unknown location.

5. A television navigation and position aiding system as set forth in claim 1, wherein:
said mutually common redundant waveform components are the vertical synchronizing pulses of the received television signals.

6. A television navigation and positioning aiding system as set forth in claim 1, wherein:
said mutually common redundant waveform components are the equalizing pulses of the received television signals.

7. A television navigation and positioning aiding system as set forth in claim 1, wherein:
said mutually common redundant waveform components are the horizontal synchronizing pulses of the received television signals.

8. A television navigation and positioning aiding system as set forth in claim 1, wherein:
said mutually common redundant waveform components are the color bursts of received color television signals.

9. A television navigation and position aiding system responsive to television signals and no other radiated signals conforming to the same technical standard synchronously radiated from three known locations, and including mutually common redundant waveform components, comprising:
television signal receiving means for simultaneously receiving at an unknown location said signals and extracting from each signal a predetermined said mutually common redundant waveform component; means responsive to said receiving means to measure the elapsed times between the extraction of said predetermined component first from one received signal, then from the second received signal, then from the third received signal; means to derive from said measured elaspsed times and said known locations at least two intersecting hyperbolic lines of position to define simultaneous coordinates of said unknown location.

10. A television navigation and position aiding system as set forth in claim 9 wherein:
said mutually common redundant waveform components are the vertical synchronizing pulses of the received television signals.

11. A television navigation and position aiding system as set forth in claim 9 wherein:
said mutually common redundant waveform components are the equalizing pulses of the received television signals.

12. A television navigation and position aiding system as set forth in claim 9, wherein:
said mutually common redundant waveform components are the horizontal synchronizing pulses of the received television signals.

13. A television navigation and position aiding system as set forth in claim 9, wherein:
said mutually common redundant waveform components are the color bursts of the received color television signals.

14. A television navigation and positioning receiver comprising:
an antenna, for capturing at an unknown location at least two television signals and no other radiated signals generated identically in accordance with the same technical standard and synchronously radiated from two different known locations; first and second receiving subsystems, each connected to said antenna and each including means for signal selection, amplification, detection and derivation of a single pulse in response to the presence of vertical synchronizing waveform components within the television signal selected for reception with each said subsystem; means connected to said subsystems for measuring the elapsed time between pulses successively derived by said first and second receiving subsystems; means responsive to said means for measuring to deduce from said measured elapsed time and known locations a hyperbolic line of position to define a coordinate of said unknown location.

15. A navigation and positioning receiver, comprising:
an antenna for capturing at an unknown receiving location at least two television signals and no other radiated signals generated identically in accordance with the same technical standard and synchronously radiated from two different known locations; first and second receiving subsystems, each connected to said antenna and each including means for signal selection, amplification, detection of composite video, extraction of color burst waveforms and generating from said color burst waveforms a pulse train in which the pulses are coherent with the frequency, phase and pattern of received color bursts, and for selecting from said pulse train a specified pulse; means connected to said subsystems for measuring the elapsed time between the presence of said pulses at the outputs of first one said receiving subsystem and then the other said receiving subsystem; means responsive to said means for measuring for deriving from said measured elapsed time and known locations a hyperbolic line of position to define a coordinate of the location of said receiver.

* * * * *